United States Patent Office 3,313,752
Patented Apr. 11, 1967

3,313,752
PROCESS FOR THE PREPARATION OF MODIFIED POLYOXYMETHYLENES FROM TRIOXAN WITH POLYAMINOAMIDES
Henri Sack, Creil, France, assignor to Houilleres Du Bassin Du Nord and Du Pas-De-Calais, Douai, Nord, France, a French establishment
No Drawing. Filed Jan. 7, 1964, Ser. No. 336,140
Claims priority, application France, Jan. 10, 1963, 921,043
4 Claims. (Cl. 260—18)

This invention is concerned with a process for the preparation of modified polyoxymethylenes from trioxan.

It is known to stabilise polyoxymethylenes by introducing polyamides into these polymers, suitable polyamides being, for example, those of the nylon 6,6 (polyhexamethylene adipamide) and the nylon 6,10 type as well as copolyamides. The favourable stabilisation effect arises essentially from the fact that such polyamides are compatible with the polyoxymethylenes and inhibit the decomposition of the chain of the latter.

It is also known to prepare polyoxymethylenes by polymerisation of trioxan, for example by subjecting the latter to ionising radiation.

Taking into account these two known facts, it would normally be considered appropriate to introduce polyamides having a stabilising action towards polyoxymethylenes at the beginning of the polymerisation process leading to the formation of the polyoxymethylene, in order to avoid the disadvantages of the addition of stabilising additives after polymerisation, these disadvantages being due essentially to the necessity of maintaining the polyoxymethylene molten and of effecting mixing in the hot, during which period at an elevated temperature the polyoxymethylene deteriorates due to partial decomposition before being stabilised.

I have found, however, as a result of numerous comparative experiments that in general when polyamides are added to trioxan prior to the polymerisation of the latter, good stabilisation of the polyoxymethylene product is not obtained. I have observed that the majority of polyamides are not soluble in molten trioxan and I have established the surprising fact that certain polyamides are partially soluble in molten trioxan and that it is only the latter which, when added initially to the trioxan, enable stabilised polyoxymethylenes to be obtained by the known process of polymerisation under ionising irradiation.

In these experiments I have used nylon 6,6 which does not dissolve in trioxan at 75° C. and also linear copolyamides such as the copolymers 6,6; 6 and 6,10 which dissolve in trioxan at 75° C. in a proportion substantially less than 0.1%. These linear polyamides, when introduced into the trioxan starting material, do not enable stabilised polyoxymethylenes to be obtained.

I have also used in these comparative experiments linear polyamides which have been subjected to N-methoxymethylation and in the case of polyamides which are to a large extent N-methoxymethylated, the desired result is not obtained, the polyamides thus treated not having a solubility in trioxan at 75° C. greater than 0.1%.

According to the present invention, I provide a process for the production of modified polyoxymethylenes which comprises adding to trioxan at a temperature above its melting point, a polyamide having a solubility in trioxan at 75° C. of more than 0.1% and then subjecting the trioxan, in the solid state, to ionising irradiation.

The quantity of polyamide employed is preferably approximately equal to that which gives a saturated solution in trioxan at 75° C.

The polymerisation process may be carried out in such a way as to obtain a rate of conversion which gives the desired proportion of polyamide with respect to polyoxymethylene in the final product.

In carrying out the process according to the invention, that is to say using a polyamide which is partially soluble in molten trioxan, a bonding or combination is obtained between at least a part of the polyamide and the polymer being formed so that treatment of the final polymer with a solvent for the polyamide only enables that part which is not bound to be extracted.

I have observed that it is possible to obtain a very intimate mixture of trioxan and the polyamides used in the process according to the invention and that an absorption of the polyamide on the surface of the trioxan crystals is obtained, even in the non-dissolved state; this homogeneity is also found in the final polymerised product and enables the desired stabilisation effect to be obtained.

Suitable types of polyamides for use in the process according to the invention are as follows:

(a) Initially linear copolyamides which have been oxymethylated or etherified with cyclic alcohols such as, for example, furfurol or benzyl alcohol. In such polyamides, the etherified function plays the part of a side chain which solubilises the product in trioxan;

(b) Polyaminoamides obtained by the condensation of a dimer or trimer of an unsaturated fatty acid containing at least 10 carbon atoms with at least the stoichiometric quantity of a diamine or triamine; the branched structure and the presence of olefinic side chains in these polyaminoamides renders them soluble in molten trioxan. Their solubility can exceed several percent in trioxan at 75° C. and, in addition, the double bonds and the side chains of these polyaminoamides give them a marked antioxidant character and also a plasticising character. Polyaminoamides of this kind are available commercially under the trade name "Versamid";

(c) Natural proteins such as those designated as "soluble in alcohol," zein is, for example, suitable.

The following comparative experiments will further illustrate the invention:

*First experiment*

1% of a polyaminoamide (available commercially under the trade name "Versamid" 940 and having the following characteristics: amine index (value) 3; melting point (ASTM 1240) 105 to 115° C.; viscosity at 160° C. (in poises) 12–18) was added, as a 3% solution in a 1:1 benzene-butanol mixture, to fibrous polyoxymethylene obtained by radio-chemical polymerisation of trioxan. The solvent was evaporated while agitating the fibrous mass in order to obtain the most homogeneous distribution possible of the polyaminoamide.

*Second experiment*

The same polyaminoamide was introduced into trioxan at 75° C. Solution was effected to saturation of the trioxan which corresponded approximately to a proportion of 1%. The trioxan was then crystallised and polymerisation was initiated by preirradiation at ambient temperature using a source of cobalt 60. The total irradiation dose was 50,000 rad at an intensity of 1000 rad/hour. After purging under the reduced pressure provided by a water pump and then introducing an excess pressure of 1 kg./cm.$^2$ of oxygen-free nitrogen, the mixture was polymerised for 24 hours at 52° C. The reaction mass was then washed with a mixture of equal parts of butanol and benzene (which is a solvent for the polyaminoamide used).

Third experiment

A finely ground powder of nylon 6,6 was introduced into trioxan at 75° C. and the mixture was then treated as described in the second experiment.

Fourth experiment

This was a control experiment with the same polymer as was used in experiment No. 1, but to which no stabilising agent had been added.

The following table shows the characteristics of the products obtained.

DECOMPOSITION OF POLYMER AT 160° C.

| | Test No. | | | |
|---|---|---|---|---|
| | 1<br>Heterogeneous | 2<br>Homogeneous | 3<br>Very heterogeneous | 4<br>Homogeneous |
| Appearance of polymer after— | | | | |
| 30 minutes | 5 percent | 1 percent | 6 percent | 6 percent. |
| 60 minutes | 8 percent | 2 percent | 10 percent | 10 percent. |
| 120 minutes | 14 percent | 3 percent | 19 percent | 18 percent. |
| 2,000 minutes | 55 percent | 12 percent | 92 percent | 80 percent. |
| Appearance of product moulded by compression at 185° C. | Blemished blisters | Uniform, without blisters. | Large blemishes, numerous blisters. | Uniform blisters. |

It is remarkable that the values obtained in the third test are not better than those obtained in the fourth test.

The following examples are given by way of illustration only.

A polyaminoamide of the following physical characteristics was used:

| | |
|---|---|
| Amine index | 3. |
| Melting point (ASTM 1240) | 105–115° C. |
| Viscosity | 35–45 poises at 150° C. |
| Density | 0.98. |
| Penetration at 25° C. (ASTM D5.52) | 3. |

This polyaminoamide is available commercially under the trade name "Versamid 930."

The solubility of this polyaminoamide in trioxan is 0.65% at 75° C.

The polyaminoamide was dissolved in the trioxan at 90° C. The mixture was then allowed to cool and the trioxan was crystallised while agitating the mixture so as to avoid formation of clots of polyaminoamide; the latter is, in part, dissolved and, in part, finely dispersed in the mass of trioxan. 1% of polyaminoamide was thus introduced into the trioxan.

The characteristics of the trioxan used were as follows:

| | |
|---|---|
| Melting point °C | 59.5 |
| Water content p.p.m | 200 |
| Formaldehyde content p.p.m | 250 |
| Formic acid content p.p.m | 70 |
| Nitrogen content p.p.m | 15 |
| Sulphur content p.p.m | 10 |
| Ash p.p.m | 3 |

This trioxan was exposed at ambient temperature, in air and under ordinary pressure to radiation from a source of cobalt 60. The intensity of the irradiation was 1000 rad/hour and it was continued for 50 hours. The irradiated product was then divided into three equal parts which were separately sealed into three autoclaves which were purged under a vacuum of 1 mm. Hg for ¼ hour and then filled with pure nitrogen under a pressure of 2 kg./cm.². Polymerisation was effected at a temperature of 56° C. for 2 hours in the case of the first autoclave, 5 hours in the case of the second and 48 hours in the case of the third.

At the end of these periods, the autoclaves were opened.

First autoclave: after opening the autoclave, the reaction mass was washed with hot xylene and 7% of a product was obtained which was then freed of small quantities of non-fixed polyaminoamide by extraction with a 1:1 mixture of isopropanol and toluene. The polymer thus obtained contained 12% of polyamide-type constituents which were inextractable. The product could be converted at about 180° C. into sheets, rods, plates and shaped articles having excellent mechanical properties. The weight loss of this material at a temperature 160° C. was less than 0.2% per hour. A nonstabilised polyoxymethylene resin, obtained from the same trioxan under the same conditions but not including the polyaminoamide, decomposed under the same conditions at a rate at least 40 times greater.

After opening the second autoclave and washing the reaction mass with hot xylene, 20% of a product containing 4.1% of inextractable polyamide-type constituents was obtained. A supplementary washing with the 1:1 isopropanol-toluene mixture established that the greater part of the polyaminoamide chains had been rendered inextractable. The material obtained could be converted as such at 180° C. into sheets, rods, extruded profiles etc., without it being necessary to subject it to a preliminary stabilisation treatment. In this case, the thermal decomposition of the product at 160° C. was about 0.5% per hour.

In order to use this polymer as a moulding powder, it is nevertheless preferable to subject it to a degrading acylation treatment. After treatment under reflux for ¼ hour with 10 volumes of butyric anhydride containing 50 p.p.m. of sodium acetate and copious washing of the treated product with acetone, a product is obtained having a thermal decomposition at 160° C. of less than 0.02% per hour. The moulding powder thus obtained is of excellent quality. The infra red spectrum of this powder shows a marked absorption band at 6.3μ.

After opening the third autoclave and washing the reaction mass with hot xylene, 35% of a product containing about 2% of inextractable polyamide-type constituents was obtained. Its thermal decomposition at 160° C. was about 0.6% per hour. The stability of this product is sufficient for it to be convertible, in apparatus provided with good ventilation, into useful shaped articles.

In order to use this product as a moulding powder, it is preferable to subject it to a treatment similar to that described above for the product of the second autoclave. The stability of the acylated product is of the same order as that described above (0.02% per hour), but the product is harder and more viscous and moulding of it should be carried out at a temperature above 190° C.

I claim:

1. A process for the preparation of modified polyoxymethylene which comprises adding to trioxan, at a temperature above its melting point, a polyaminoamide which is the condensation product of a dimer or trimer of an unsaturated fatty acid containing at least 10 carbon atoms with at least the stoichiometric quantity of a diamine or triamine, and which has a solubility in trioxan at 75° C. of more than 0.1%, and, after the addition of said polyaminoamide to the trioxan, subjecting the trioxan, in the solid state, to ionizing radiation.

2. The process according to claim 1; wherein the quantity of said polyaminoamide added to the trioxan is approximately equal to amount which gives a saturated solution in trioxan at 75° C.

3. The process according to claim 1; wherein approximately 1% by weight of said polyamide is added to the trioxan.

4. Oxymethylene polymer having bonded thereto approximately 1% by weight of a polyaminoamide which is the condensation product of a dimer or trimer of an unsaturated fatty acid containing at least 10 carbon atoms with at least the stoichiometric quantity of a diamine or triamine.

References Cited by the Examiner

UNITED STATES PATENTS

| | | | |
|---|---|---|---|
| 2,844,561 | 7/1958 | Bechtold et al. | 260—67 |
| 3,046,249 | 7/1962 | Hermann et al. | 260—67 |
| 3,103,499 | 9/1963 | Dolce et al. | 260—67 |
| 3,116,267 | 12/1963 | Dolce | 260—67 |

OTHER REFERENCES

Okamura et al., Radiation-Induced Solid State Polymerization of Ring Compounds, Journal of Polymer Science, vol. 58, pp. 925–953, April 1962.

SAMUEL H. BLECH, *Primary Examiner.*

MURRAY TILLMAN, *Examiner.*

R. B. TURER, N. F. OBLON, *Assistant Examiners.*